No. 849,949. PATENTED APR. 9, 1907.
G. A. WEAVER.
TRANSMISSION MECHANISM.
APPLICATION FILED FEB. 16, 1906.
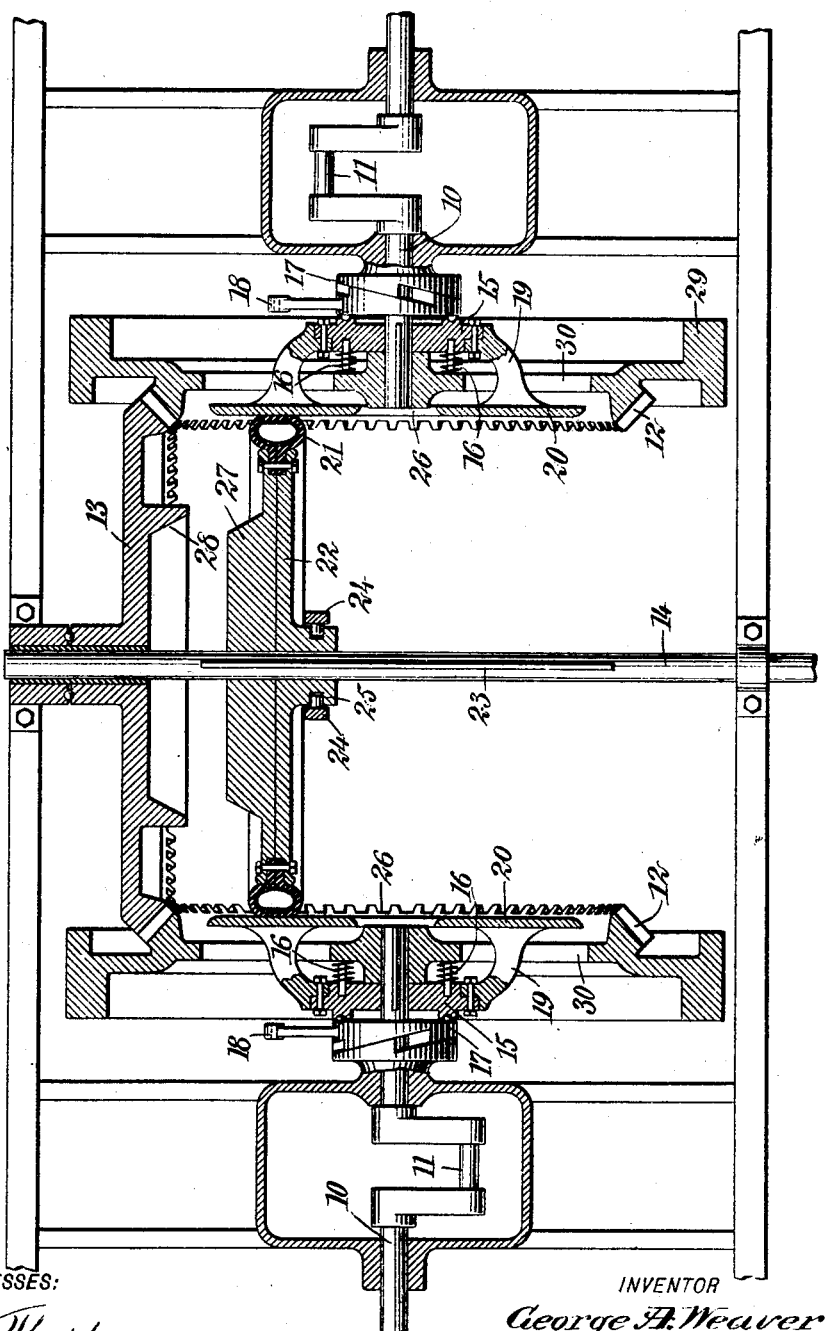
WITNESSES:
Edward Thorpe.
A. E. Fail.
INVENTOR
George A. Weaver
BY
Munn & Co
ATTORNEYS

UNITED STATES PATENT OFFICE.

GEORGE A. WEAVER, OF NEWPORT, RHODE ISLAND.

TRANSMISSION MECHANISM.

No. 849,949.  Specification of Letters Patent.  Patented April 9, 1907.

Application filed February 16, 1906. Serial No. 301,368.

*To all whom it may concern:*

Be it known that I, GEORGE A. WEAVER, a citizen of the United States, and a resident of Newport, in the county of Newport and State of Rhode Island, have invented a new and Improved Transmission Mechanism, of which the following is a full, clear, and exact description.

My invention relates to a transmission mechanism capable of many uses, but especially adapted for application to automobiles.

The principal objects of the invention are to provide means whereby two engines can be coupled up, so as to simultaneously transmit power at varying rates of speed to a driven shaft, to provide for driving a shaft and the other engine or motor by one of the engines or motors in case of breakage, to provide an efficient means for transmitting the power when the speed is to be varied, and to generally simplify and improve constructions of this character.

Reference is to be had to the accompanying drawing, forming a part of this specification, in which similar characters of reference indicate corresponding parts in the figure.

The figure is a longitudinal central sectional view of a transmitting mechanism constructed in accordance with the principle of my invention.

I have shown a pair of engine or motor shafts 10, each having a crank 11, connected with the engines or motors. The shafts are preferably driven in opposite directions in order to provide certain conveniences in construction, as will appear below. Each shaft is provided with a gear 12, preferably beveled, for transmitting power to a gear 13, rotatably mounted on a driven member in the form of a shaft 14.

It will be observed that through the two gears 12, driven in opposite directions, the gear 13 will be rotated by both the motors, and when means is provided for transmitting the rotation of the gear 13 to the shaft 14 the automobile or other device will be driven by both motors at the same time.

In order to provide for connecting the driving members 10 with the driven member 14, I have shown a plate 15, mounted on each of the driving-shafts and keyed thereto. A series of springs normally force this plate rearwardly from the gear 12, wnile a cam 17, operated by a lever 18, is provided for forcing this plate toward the gear against the opposition of the springs. On the plate is mounted a skeleton frame 19, which carries a circular plate 20. This plate may be provided with a corrugated or roughened surface, against which bears a pneumatic tire 21 on a wheel 22. This wheel is provided with a keyway and slides on the shaft 14, which has a key 23 through the keyway in the wheel, so that the motion of rotation of the wheel will be transmitted to the shaft.

It will be obvious that by manipulating a lever 24, connected with a collar 25 on the wheel, the wheel can be moved outwardly and inwardly, so that motion will be transmitted to the shaft 14 at any desired rate of speed. The wheel can also be moved past the open centers 26 of the plates 20, when it will engage the lower sides of said plates, and motion will be transmitted to the shaft 14 in the opposite direction, the slower motion being provided when the tire is near the openings 26.

In order to get the most rapid motion, the wheel 22 is provided with a projection 27, fitting a cup 28 in the gear 13, the two elements 27 and 28 constituting a clutch, and when the wheel is moved out of contact with the outer edges of the surfaces of the plates 20 and the parts 27 and 28 come into engagement the rotation of the wheel 13 will be transmitted directly to the shaft 14, with which the wheel 22 is held in engagement by the key.

It will be understood that the levers 18 and 24 may be operated simultaneously when connected together and that the manner of operating these levers is not material. By the use of the pneumatic tire 21 in this connection the surfaces of the plates 20 may be corrugated or roughened, so as to prevent slipping at this point, and the transmission of power from the driving members 10 to the driven member 14 will be certain and efficient. The wheels 12 are provided with heavy rims 29, constituting fly-wheels for the device.

It will be understood, of course, that when one of the motors is disabled the other can be used to drive the whole system, including the disabled motor, and that the various speeds in both directions are provided for in such a manner that sudden changes from one speed to another are not necessary, the transitions being gradual. As the skeleton frame 19 passes through openings 30 in the webs of the gear 12 the rotation of the gear would be transmitted to the plate 15 even if it were not connected with the shaft, as is the gear 12.

The gear 13 acts as an equalizer between the two power-shafts and driving-plates as long as each one gives power and acts as a driving medium to the shaft 14 only when the wheel 22 is interlocked with the gear 13 by means of the clutch after the tire 21 has passed beyond the edges of the plates 20. The power applied by the two shafts and plates controls the wheel 22 from two opposite sides through friction on the two plates, thus dividing the friction and doing away with any resistance due to this friction on the shaft-box.

Having thus described my invention, I claim—

1. A transmitting mechanism comprising alined driving-shafts spaced apart from each other, bevel-gears of equal size on the adjacent ends of the driving-shafts, a driven shaft between the alined shafts and at right angles thereto, a bevel-gear loosely mounted on said driven shaft and meshing with the bevel-gears on the alined shafts and provided with a clutch-face, a friction-wheel slidably mounted on the driven shaft and provided with a clutch-face coöperating with the clutch-face of the bevel-gear, friction-disks slidably mounted on the driving-shafts and keyed thereto, said disks engaging the periphery of the friction-wheel, and means for moving the friction-disks toward and from the friction-wheel.

2. A transmitting mechanism comprising alined driving-shafts spaced apart from each other, bevel-gears of equal size on the adjacent ends of the driving-shafts, a driven shaft between the alined shafts and at right angles thereto, a bevel-gear loosely mounted on said driven shaft and meshing with the bevel-gears on the alined shafts and provided with a clutch-face, a friction-wheel having a pneumatic tire slidably mounted on the driven shaft and provided with a clutch-face coöperating with the clutch-face of the bevel-gear, friction-disks slidably mounted on the driving-shafts and keyed thereto, said disks engaging the periphery of the friction-wheel, and means for moving the friction-disks toward and from the friction-wheel.

3. A transmitting mechanism comprising a plurality of driving-shafts, a driven shaft, means in connection with the driving-shafts and the driven shaft for equalizing the movements of the driving-shafts, a friction-wheel keyed to the driven shaft and movable longitudinally thereof, friction-disks on the driving-shafts engaged by the friction-wheel, and means for moving the friction-wheel whereby to vary the point of engagement with the disks.

4. A transmitting mechanism comprising a plurality of driving-shafts, a driven shaft, means in connection with the shafts for equalizing the movements of the driving-shafts, and a variable-speed connection between the driving-shafts and the driven shaft.

In testimony whereof I have signed my name to this specification in the presence of two subscribing witnesses.

GEORGE A. WEAVER.

Witnesses:
SYDNEY D. HARVEY,
CHARLES E. HARVEY.